United States Patent
Wang et al.

(10) Patent No.: US 10,809,493 B2
(45) Date of Patent: Oct. 20, 2020

(54) OPTICAL LENS

(71) Applicant: Rays Optics Inc., Hsinchu County (TW)

(72) Inventors: Kuo-Chuan Wang, Hsinchu County (TW); Sheng-Tang Lai, Hsinchu County (TW); Hsin-Te Chen, Hsinchu County (TW); Chen-Cheng Lee, Hsinchu County (TW)

(73) Assignee: Rays Optics Inc., Hukou Township, Hsinchu County (TW)

( * ) Notice: Subject to any disclaimer, the term of this patent is extended or adjusted under 35 U.S.C. 154(b) by 540 days.

(21) Appl. No.: 15/674,307

(22) Filed: Aug. 10, 2017

(65) Prior Publication Data

US 2018/0143407 A1    May 24, 2018

(30) Foreign Application Priority Data

Nov. 21, 2016    (TW) .............................. 105138029 A (51) Int. Cl.
*G02B 13/00*    (2006.01)
*G02B 9/60*    (2006.01)
(Continued)

(52) U.S. Cl.
CPC ........... *G02B 13/0045* (2013.01); *G02B 9/60* (2013.01); *G02B 13/18* (2013.01); *G02B 3/04* (2013.01)

(58) Field of Classification Search
CPC .. G02B 13/0045; G02B 9/60; G02B 27/0025; G02B 13/18; G02B 5/208; G02B 5/005; G02B 13/002; G02B 3/04; G02B 13/0015; G02B 13/04; G02B 13/06; G02B 1/041; G02B 9/62; G02B 13/004; G02B 9/34;
(Continued)

(56) References Cited

U.S. PATENT DOCUMENTS

2006/0007561 A1 * 1/2006 Suzuki ...................... G02B 9/58
                                                                      359/749
2011/0102541 A1 * 5/2011 Jin ........................... G02B 13/06
                                                                        348/36
(Continued)

FOREIGN PATENT DOCUMENTS

CN    106033141 A    10/2016
TW    201527790 A     7/2015

OTHER PUBLICATIONS

Taiwanese Office Action based on corresponding Application No. 105138029; dated Nov. 6, 2019.

*Primary Examiner* — William R Alexander
*Assistant Examiner* — Sharrief I Broome
(74) *Attorney, Agent, or Firm* — Muncy, Geissler, Olds & Lowe, P.C.

(57) ABSTRACT

An optical lens includes two lens groups and an aperture stop. A total number of lenses with refractive power of the two lens groups is larger than three, and the two lens groups includes an aspheric lens with negative refractive power. The aperture stop is disposed between the two lens groups. The optical lens satisfies the following condition: $0.05>[y(\theta)-(EFL*\sin\theta)]/(EFL*\sin\theta)>-0.3$, where $\theta$ denotes a half field of view, $y(\theta)$ denotes an image height of an image plane for visible light with respect to the half field of view $\theta$, and EFL denotes an effective focal length for visible light of the optical lens.

20 Claims, 10 Drawing Sheets

(51) Int. Cl.
*G02B 13/18* (2006.01)
*G02B 3/04* (2006.01)

(58) Field of Classification Search
CPC ........ G02B 13/006; G02B 13/02; G02B 9/00;
G02B 13/00; G02B 13/001; H04N
5/2254; H04N 5/2253; H04N 5/225;
H04N 5/2258; H04N 13/282; H04N
2101/00; H04N 5/2252; H04N 5/2257;
H04N 5/232; H04N 5/23212; H04N
5/23296; H04N 5/2351; H04N 5/374;
H04N 9/045; H04N 9/097
See application file for complete search history.

(56) References Cited

U.S. PATENT DOCUMENTS

| | | | |
|---|---|---|---|
| 2013/0155314 A1* | 6/2013 | Wang | G02B 15/173 348/360 |
| 2016/0124187 A1* | 5/2016 | Chen | G02B 9/62 348/373 |
| 2017/0168271 A1* | 6/2017 | Jiang | G02B 13/18 |

\* cited by examiner

OPTICAL LENS

BACKGROUND OF THE INVENTION a. Field of the Invention

The invention relates generally to an optical lens, and more particularly to a vehicle optical lens.

b. Description of the Related Art

Recent advances in technology have led to the development of various types of optical lenses. A vehicle camera is a commonly used optical imaging lens and, when used in a driver-assistance system, often needs to satisfy some requirements such as low fabrication costs, large apertures, wide viewing angles, light weights, and wide working temperature ranges. Therefore, it is desirable to provide a vehicle camera having a wider working temperature range, lower fabrication costs and good imaging quality.

BRIEF SUMMARY OF THE INVENTION

According to one aspect of the present disclosure, an optical lens includes two lens groups and an aperture stop. A total number of lenses with refractive power of the two lens groups is larger than three, and the two lens groups includes an aspheric lens with negative refractive power. The aperture stop is disposed between the two lens groups, and the aspheric lens with negative refractive power is located on one side of the aperture stop and is further away from the aperture stop than any other lens on the same side of the aperture stop. The optical lens satisfies the following condition:

$$0.05 > [y(\theta) - (EFL * \sin \theta)]/(EFL * \sin \theta) > -0.3$$

where $\theta$ denotes a half field of view, $y(\theta)$ denotes an image height of an image plane for visible light with respect to the half field of view $\theta$, and EFL denotes an effective focal length for visible light of the optical lens.

According to the above embodiments, the optical lens may achieve at least one advantage of good imaging quality, higher degree of miniaturization, lighter weights and lower fabrication costs. Further, in one embodiment, a working temperature range of $-40°$ C. to $105°$ C. and a five-piece lens design can be provided to achieve at least one advantage of lower fabrication costs, larger apertures, higher resolution, wider viewing angles, lighter weights, wider working temperature ranges and good imaging quality.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
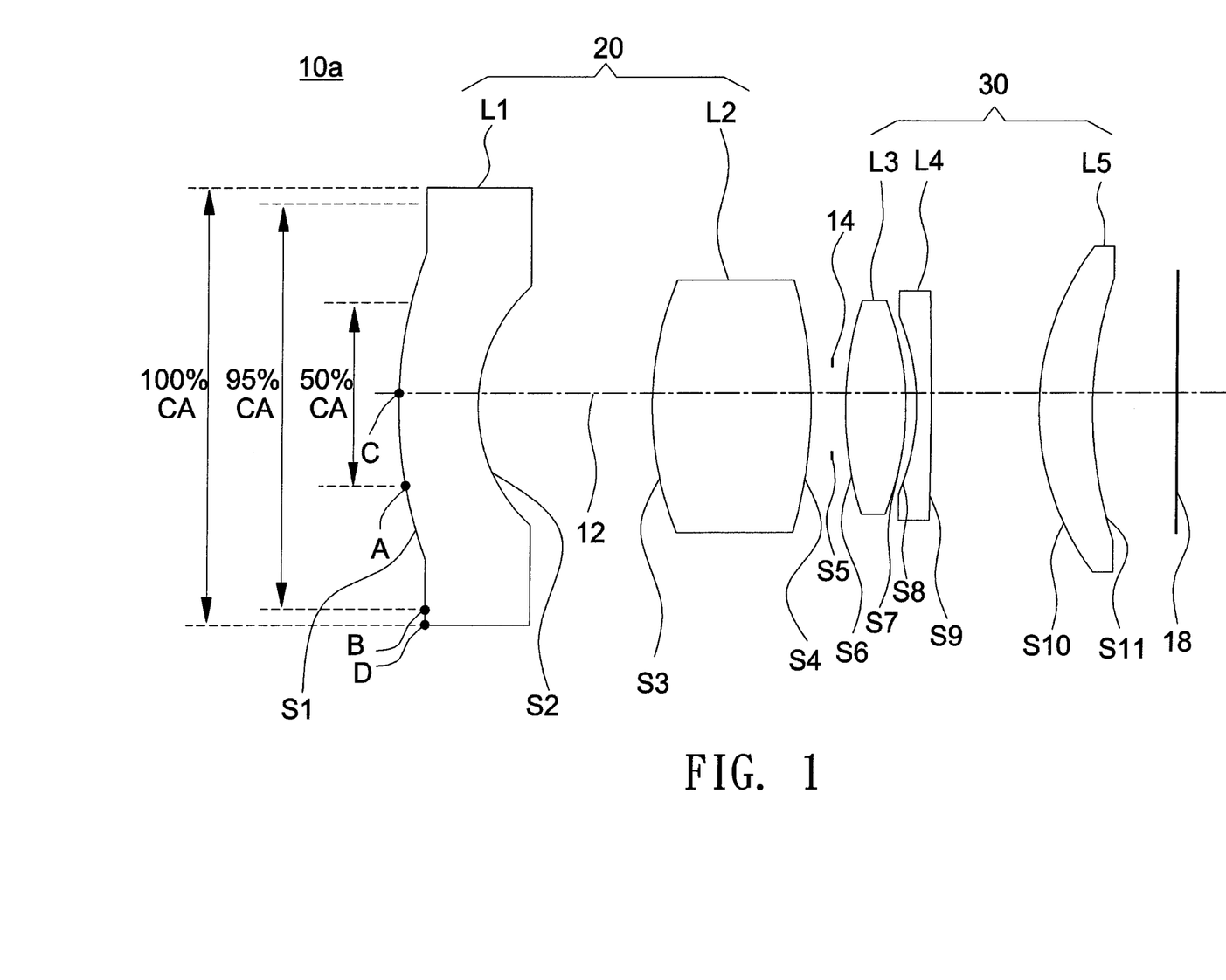
FIG. 1 shows a schematic diagram illustrating an optical lens according to an embodiment of the invention.

FIG. 1 shows a schematic diagram illustrating an optical lens according to an embodiment of the invention. The optical lens 10a is disposed between a magnified side (such as an object side on the left of FIG. 1) and a minified side (such as an image side on the right of FIG. 1). As shown in FIG. 1, the optical lens 10a may include a first lens group 20 (such as a front lens group) with positive refractive power disposed between the magnified side and the minified side, a second lens group 30 (such as a rear lens group) with positive refractive power disposed between the first lens group 20 and the minified side, and an aperture stop 14 disposed between the first lens group 20 and the second lens group 30. In one embodiment, the first lens group may have negative refractive power, but the invention is not limited thereto. Further, the minified side may be disposed with a cover glass (not shown) and an image sensor (not shown) having an image plane 18 formed at an effective focal length (EFL) for visible light. The cover glass is disposed between the second lens group 30 and the image plane 18 for visible light. In one embodiment, the minified side may be further disposed with an IR filter, but the invention is not limited thereto. The first lens group 20 may include a first lens L1 and a second lens L2 arranged in order, along the optical axis 12, from the magnified side to the minified side. The second lens group 30 may include a third lens L3, a fourth lens L4 and a fifth lens L5 arranged in order, along the optical axis 12, from the magnified side to the minified side. The refractive powers of the first lens L1 to the fifth lens L5 are negative, positive, positive, negative, positive. In this embodiment, the first lens L1 and the second lens L2 are aspheric lenses fabricated by glass molding. In one embodiment, the aspheric lenses may be fabricated by plastic injection, but the invention is not limited thereto. The third lens L3 is a biconvex lens, and the fourth lens L4 and the fifth lens L5 are meniscus lenses. In this embodiment, a refractive index variation as a function of temperature (dn/dt) of the third lens L3 may be smaller than $-6 \times 10^{-6}$ °C.$^{-1}$, but the invention is not limited thereto. In that case, a thermal focus shift of the third lens L3 is comparatively large to reduce the overall thermal focus shift and enhance the optical performance of the optical lens. In one embodiment, the first lens L1 to the fifth lens L5 are separate from each other. In an alternate embodiment, adjoining surfaces of two adjacent lenses that are cemented to form a cemented doublet have an identical or similar radius of curvature, but the invention is not limited thereto. The detailed optical data of the optical lens 10a such as lens parameters, shape and aspheric coefficients are shown in Tables 1-2 below. In the following design examples of the invention, each aspheric surface satisfies the following equation:

$$Z = \frac{cr^2}{1 + \sqrt{1 - (1+k)c^2 r^2}} + Ar^4 + Br^6 + Cr^8 + Dr^{10} + Er^{12} + Fr^{14} + \ldots, \quad (1)$$

where Z denotes a sag of an aspheric surface along the optical axis 12, c denotes a reciprocal of a radius of an osculating sphere, K denotes a Conic constant, r denotes a height of the aspheric surface measured in a direction perpendicular to the optical axis 12, and parameters A-F shown in Table 2 are 4th, 6th, 8th, 10th, 12th and 14th order aspheric coefficients of Equation 1. In this embodiment, because the optical lens is a fixed focus lens, a distance between any two lenses in the optical lens remains fixed on picking-up images at various object distances.

TABLE 1

| Surface | Radius (mm) | Thickness (mm) | Refractive index | Abbe number | Object description |
|---|---|---|---|---|---|
| S1* | 5.323 | 2.905 | 1.775 | 47.633 | L1(aspheric) |
| S2* | 2.010 | 4.415 | | | |
| S3* | 8.905 | 4.328 | 1.814 | 40.290 | L2(aspheric) |
| S4* | −10.547 | 0.961 | | | |
| S5 | ∞ | 0.100 | | | aperture stop |
| S6 | 7.473 | 1.735 | 1.500 | 81.607 | L3(biconvex) |

TABLE 1-continued

| Surface | Radius (mm) | Thickness (mm) | Refractive index | Abbe number | Object description |
|---|---|---|---|---|---|
| S7 | −5.415 | 0.178 | | | |
| S8 | −5.589 | 0.600 | 1.968 | 17.984 | L4(meniscus) |
| S9 | −24.670 | 2.944 | | | |
| S10 | 6.058 | 1.537 | 1.892 | 40.764 | L5(meniscus) |
| S11 | 10.063 | 2.296 | | | |
| | | | | | image plane |

Effective focal length (EFL) for visible light of the optical lens = 5.06 mm
Effective focal length (EFL) for visible light of the third lens L3 = 6.58 mm
F-Number = 1.8
Maximum half field of view (HFOV) = 53 degrees
Maximum image circle (IMA) of the visible light image plane = 3.16 mm
Total track length TTL (distance between the surface S1 and the visible light image plane) = 22.0 mm In the above Table 1, the field heading "thickness" represents a distance of two adjacent surfaces along the optical axis 12. For example, a thickness of the surface S1 is a distance between the surface S1 and the surface S2 along the optical axis 12, a thickness of the surface S2 is a distance between the surface S2 and the surface S3 along the optical axis 12, and a thickness of the surface S11 is a distance between the surface S11 and the visible light image plane 18 along the optical axis 12.

TABLE 2

| | S1 | S2 | S3 | S4 |
|---|---|---|---|---|
| k | −0.74 | −1.24 | 1.68 | 0 |
| A | −2.233E−03 | −9.860E−04 | −1.842E−04 | 4.887E−04 |
| B | −1.216E−04 | −9.995E−04 | −3.919E−05 | −4.924E−05 |
| C | 2.454E−06 | 1.776E−04 | 6.007E−06 | 1.405E−05 |
| D | 2.981E−07 | −1.276E−05 | −6.635E−08 | −4.672E−07 |
| E | −1.416E−08 | 4.989E−07 | −9.174E−09 | 0 |
| F | 1.881E−10 | −6.325E−09 | 0 | 0 |

Figure 2:
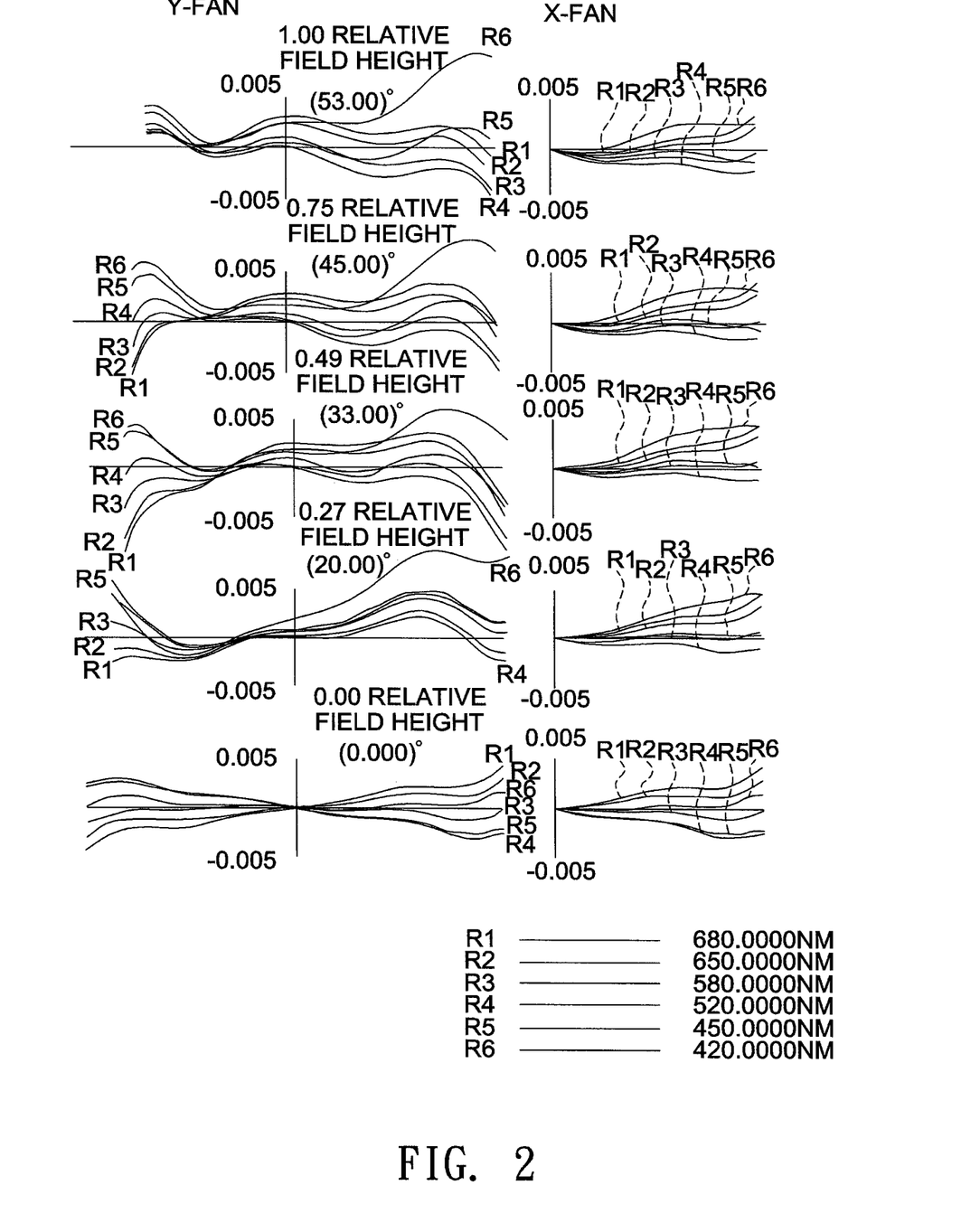
FIG. 2 shows a visible-light ray fan plot of the optical lens shown in FIG. 1.

FIG. 2 shows a visible-light ray fan plot of the optical lens 10a, where an abscissa of the plot represents entrance pupil positions, and an ordinate of the plot represents relative numerical values of positions on an image plane (such as the image plane 18) where main light beams are projected. The simulated results shown in FIG. 2 is within permitted ranges specified by the standard, which indicates the optical lens 10a according to the above embodiment may achieve good imaging quality.

The following embodiments use similar reference numerals and contain part content of the above embodiment, where similar reference numerals refer to identical or functionally similar elements throughout the embodiments and the same technical descriptions are omitted. The content omitted may refer to the embodiment previously described and thus not described repeatedly in detail in the following embodiments.

Figure 3:
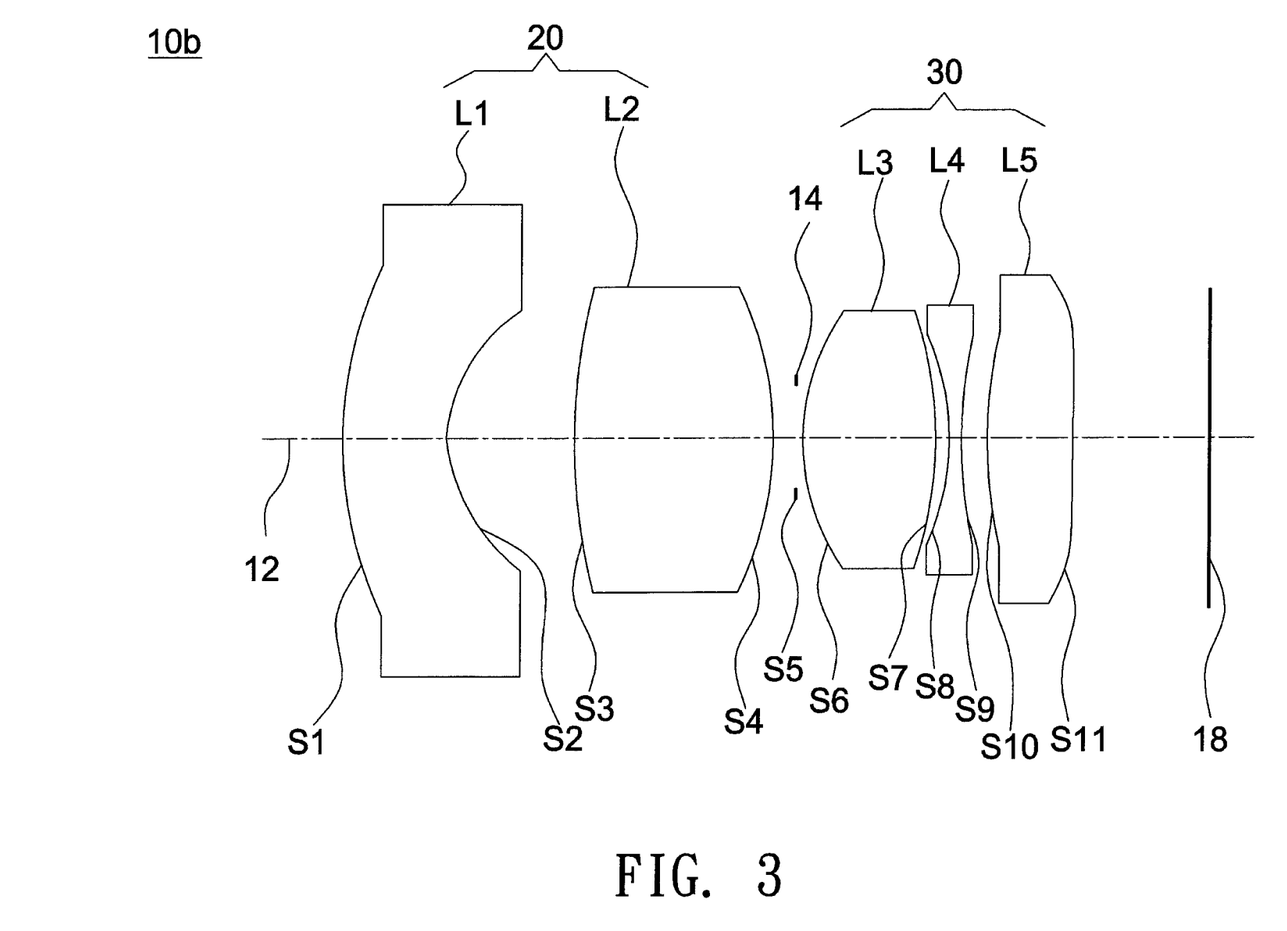
FIG. 3 shows a schematic diagram illustrating an optical lens according to another embodiment of the invention.

FIG. 3 shows a schematic diagram illustrating an optical lens according to another embodiment of the invention. The optical lens 10b is disposed between a magnified side (such as an object side on the left of FIG. 3) and a minified side (such as an image side on the right of FIG. 3). As shown in FIG. 3, the optical lens 10b may include a first lens group 20 (such as a front lens group) with positive refractive power disposed between the magnified side and the minified side, a second lens group 30 (such as a rear lens group) with positive refractive power disposed between the first lens group 20 and the minified side, and an aperture stop 14 disposed between the first lens group 20 and the second lens group 30. Further, a visible light image plane of the optical lens 10b is designated by a numeral 18. The first lens group 20 may include a first lens L1 and a second lens L2 arranged in order, along the optical axis 12, from the magnified side to the minified side. The second lens group 30 may include a third lens L3, a fourth lens L4 and a fifth lens L5 arranged in order, along the optical axis 12, from the magnified side to the minified side. The refractive powers of the first lens L1 to the fifth lens L5 are negative, positive, positive, negative, positive. In this embodiment, the first lens L1 and the fifth lens L5 are aspheric lenses fabricated by glass molding. The second lens L2 and the third lens L3 are biconvex lenses, and the fourth lens L4 is a biconcave lens. In this embodiment, a refractive index variation as a function of temperature (dn/dt) of the third lens L3 may be smaller than $-6 \times 10^{-6\circ}$ C.$^{-1}$, but the invention is not limited thereto. In that case, a thermal focus shift of the third lens is comparatively large to reduce the overall thermal focus shift and enhance the optical performance of the optical lens. In one embodiment, the first lens L1 to the fifth lens L5 are separate from each other. The detailed optical data of the optical lens 10b such as lens parameters, shape and aspheric coefficients are shown in Tables 3-4 below. Parameters A-F shown in Table 4 are 4th, 6th, 8th, 10th, 12th and 14th order aspheric coefficients of Equation 1. In this embodiment, because the optical lens is a fixed focus lens, a distance between any two lenses in the optical lens remains fixed on picking-up images at various object distances.

TABLE 3

| Surface | Radius (mm) | Thickness (mm) | Refractive index | Abbe number | Object description |
|---|---|---|---|---|---|
| S1* | 4.359 | 2.423 | 1.814 | 40.290 | L1(aspheric) |
| S2* | 1.879 | 3.244 | | | |
| S3 | 12.430 | 4.736 | 1.702 | 55.527 | L2(biconvex) |
| S4 | −6.954 | 0.700 | | | |
| S5 | ∞ | 0.100 | | | aperture stop |
| S6 | 4.451 | 3.150 | 1.500 | 81.607 | L3(biconvex) |
| S7 | −6.803 | 0.250 | | | |
| S8 | −5.983 | 0.500 | 1.823 | 22.760 | L4(biconcave) |
| S9 | 14.646 | 0.566 | | | |
| S10* | 7.164 | 2.062 | 1.696 | 52.750 | L5(aspheric) |
| S11* | ∞ | 2.241 | | | |
| | | | | | image plane |

Effective focal length (EFL) for visible light of the optical lens = 5.05 mm
Effective focal length (EFL) for visible light of the third lens L3 = 5.94 mm
F-Number = 1.8
Maximum half field of view (HFOV) = 53 degrees
Maximum image circle (IMA) of the visible light image plane = 3.16 mm
Total track length TTL (distance between the surface S1 and the visible light image plane) = 19.98 mm A thickness of the surface S1 is a distance between the surface S1 and the surface S2 along the optical axis 12, a thickness of the surface S2 is a distance between the surface S2 and the surface S3 along the optical axis 12, and a thickness of the surface S11 is a distance between the surface S11 and the visible light image plane 18 along the optical axis 12.

TABLE 4

| | S1 | S2 | S10 | S11 |
|---|---|---|---|---|
| k | −0.59 | −0.72 | 0 | 0 |
| A | −2.582E−03 | −8.786E−03 | −2.880E−03 | −3.950E−03 |
| B | −1.899E−04 | −1.544E−03 | −9.555E−05 | 3.398E−04 |
| C | −2.499E−06 | 1.963E−04 | 1.485E−05 | −4.031E−05 |
| D | 1.096E−06 | −1.012E−05 | −4.222E−06 | 8.717E−07 |
| E | −4.849E−08 | 2.931E−08 | 1.604E−16 | 4.31E−16 |
| F | 6.916E−10 | −4.138E−12 | 3.511E−19 | −5.39E−19 |

Figure 4:
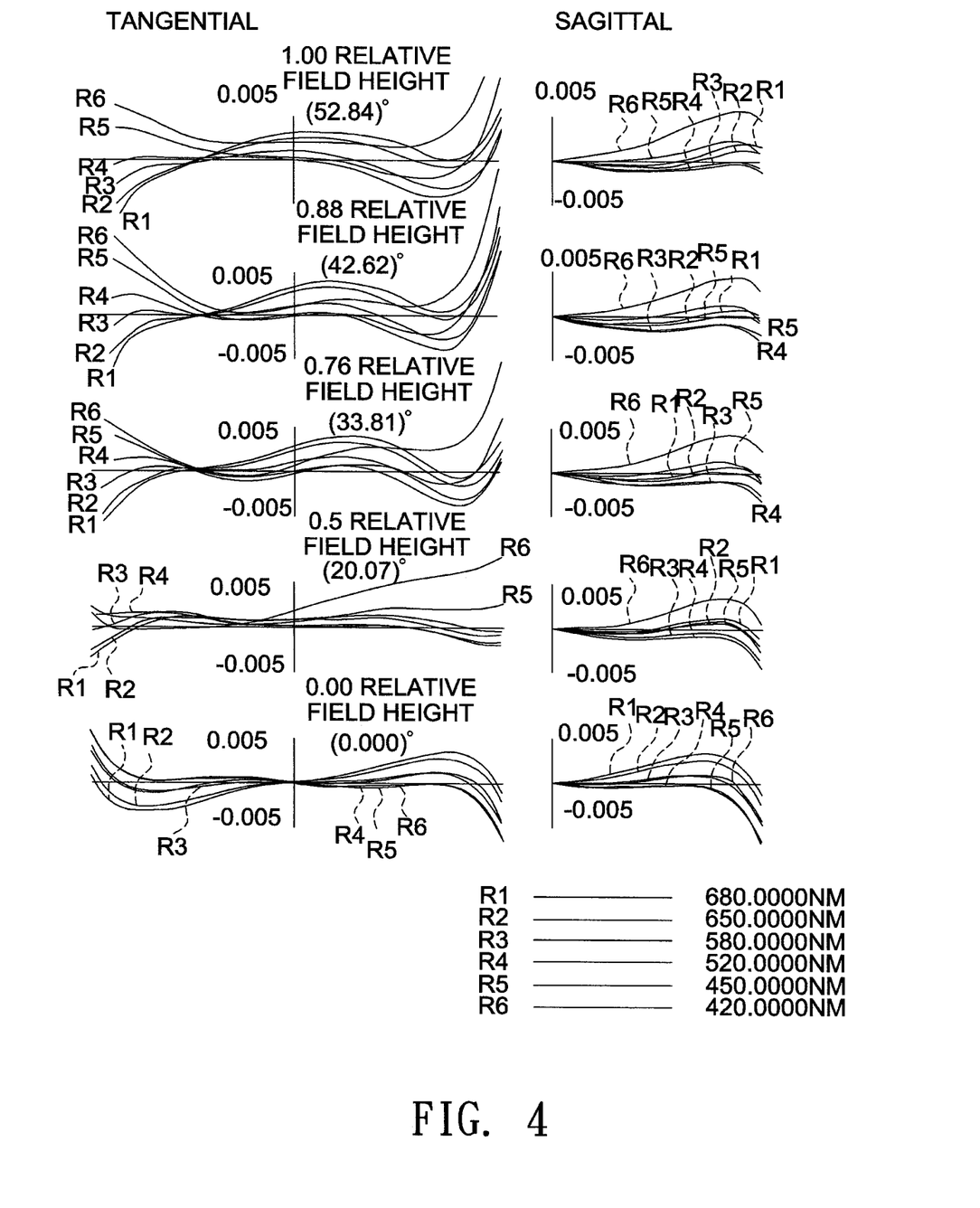
FIG. 4 shows a visible-light ray fan plot of the optical lens shown in FIG. 3.

FIG. 4 shows a visible-light ray fan plot of the optical lens 10b, where an abscissa of the plot represents entrance pupil positions, and an ordinate of the plot represents relative numerical values of positions on an image plane (such as the image plane 18) where main light beams are projected. The simulated results shown in FIG. 4 is within permitted ranges specified by the standard, which indicates the optical lens 10b according to the above embodiment may achieve good imaging quality.

Figure 5:
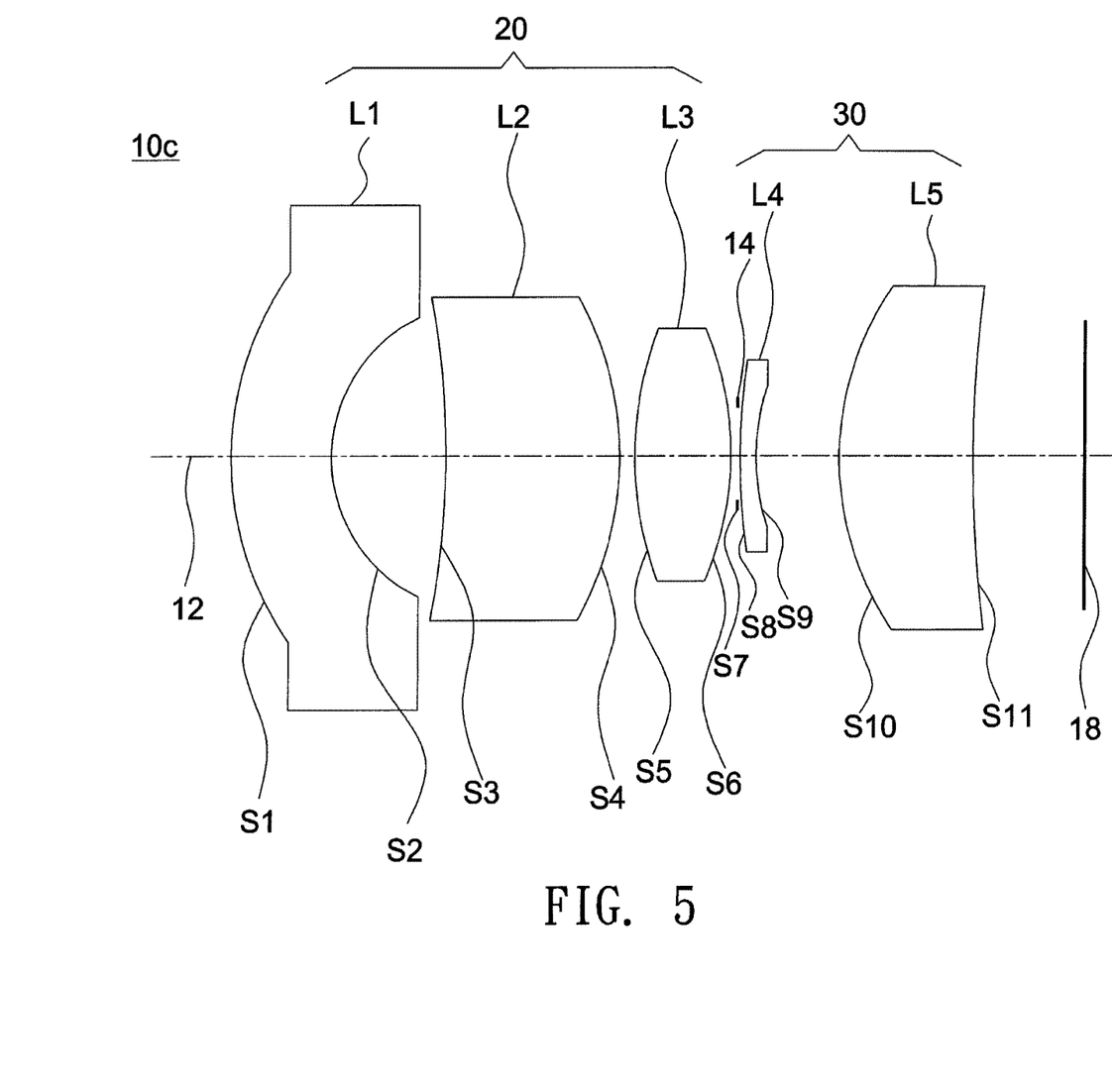
FIG. 5 shows a schematic diagram illustrating an optical lens according to another embodiment of the invention.

FIG. 5 shows a schematic diagram illustrating an optical lens according to another embodiment of the invention. The optical lens 10c is disposed between a magnified side (such as an object side on the left of FIG. 5) and a minified side (such as an image side on the right of FIG. 5). As shown in FIG. 5, the optical lens 10c may include a first lens group 20 (such as a front lens group) with positive refractive power disposed between the magnified side and the minified side, a second lens group 30 (such as a rear lens group) with positive refractive power disposed between the first lens group 20 and the minified side, and an aperture stop 14 disposed between the first lens group 20 and the second lens group 30. Further, a visible light image plane of the optical lens 10c is designated by a numeral 18. The first lens group 20 may include a first lens L1, a second lens L2 and a third lens L3 arranged in order, along the optical axis 12, from the magnified side to the minified side. The second lens group 30 may include a fourth lens L4 and a fifth lens L5 arranged in order, along the optical axis 12, from the magnified side to the minified side. The refractive powers of the first lens L1 to the fifth lens L5 are negative, positive, positive, negative, positive. In this embodiment, the first lens L1 and the second lens L2 are aspheric lenses fabricated by glass molding. The third lens L3 are biconvex lenses, and the fourth lens L4 and the fifth lens L5 are meniscus lenses. In this embodiment, a refractive index variation as a function of temperature (dn/dt) of the third lens L3 may be smaller than $-6 \times 10^{-6\circ}$ C.$^{-1}$, but the invention is not limited thereto. In that case, a thermal focus shift of the third lens is comparatively large to reduce the overall thermal focus shift and enhance the optical performance of the optical lens. In one embodiment, the first lens L1 to the fifth lens L5 are separate from each other. The detailed optical data of the optical lens 10c such as lens parameters, shape and aspheric coefficients are shown in Tables 5-6 below. In the following design examples of the invention, each aspheric surface satisfies the following equation:

$$Z = \frac{cr^2}{1+\sqrt{1-(1+k)c^2r^2}} + Ar^1 + Br^2 + Cr^3 + Dr^4 + Er^5 + Fr^6 + \\ Gr^7 + Hr^8 + Ir^9 + Jr^{10} + Kr^{11} + Lr^{12} + Mr^{13} + Nr^{14} \ldots, \quad (2)$$

where Z denotes a sag of an aspheric surface along the optical axis 12, c denotes a reciprocal of a radius of an osculating sphere, K denotes a Conic constant, r denotes a height of the aspheric surface measured in a direction perpendicular to the optical axis 12. Parameters A-N shown in Table 6 are 1th to 14th order aspheric coefficients of Equation 2. In this embodiment, because the optical lens is a fixed focus lens, a distance between any two lenses in the optical lens remains fixed on picking-up images at various object distances.

TABLE 5

| Surface | Radius (mm) | Thickness (mm) | Refractive index | Abbe number | Object description |
|---|---|---|---|---|---|
| S1* | 14.763 | 2.433 | 1.590 | 61.050 | L1(aspheric) |
| S2* | 4.958 | 2.688 | | | |
| S3* | −13.687 | 4.000 | 1.814 | 40.290 | L2(aspheric) |
| S4* | −5.319 | 0.267 | | | |
| S5 | 6.222 | 2.454 | 1.459 | 90.268 | L3(biconvex) |
| S6 | −6.309 | 0.050 | | | |
| S7 | ∞ | 0.026 | | | aperture stop |
| S8 | 16.942 | 0.500 | 1.943 | 18.895 | L4(meniscus) |
| S9 | 5.566 | 1.984 | | | |
| S10 | 5.684 | 3.216 | 1.596 | 68.533 | L5(meniscus) |
| S11 | 93.386 | 2.040 | | | |
| | | | | | image plane |

Effective focal length (EFL) for visible light of the optical lens = 5.07 mm
Effective focal length (EFL) for visible light of the third lens L3 = 7.28 mm
F-Number = 1.8
Maximum half field of view (HFOV) = 53 degrees
Maximum image circle (IMA) of the visible light image plane = 3.16 mm
Total track length TTL (distance between the surface S1 and the visible light image plane) = 19.66 mm A thickness of the surface S1 is a distance between the surface S1 and the surface S2 along the optical axis 12, a thickness of the surface S2 is a distance between the surface S2 and the surface S3 along the optical axis 12, and a thickness of the surface S11 is a distance between the surface S11 and the visible light image plane 18 along the optical axis 12.

TABLE 6

| | S1 | S2 | S3 | S4 |
|---|---|---|---|---|
| k | 0 | 0 | 0 | 0 |
| A | 0 | 0 | 0 | 0 |
| B | 1.101E−01 | 2.119E−01 | 0 | 0 |
| C | −1.678E−03 | 9.398E−03 | 0 | 0 |
| D | −1.777E−03 | −3.472E−02 | −2.430E−03 | 6.811E−04 |
| E | 8.932E−04 | 4.547E−02 | 0 | 0 |
| F | 7.335E−05 | −2.779E−02 | −1.219E−03 | −3.339E−05 |
| G | −4.785E−04 | 1.693E−03 | 0 | 0 |
| H | 1.371E−04 | 4.555E−03 | −3.546E−05 | 6.016E−06 |
| I | −1.021E−05 | −1.825E−03 | 0 | 0 |
| J | −1.241E−07 | 2.282E−04 | 4.997E−06 | −3.031E−08 |
| K-N | 0 | 0 | 0 | 0 |

Figure 6:
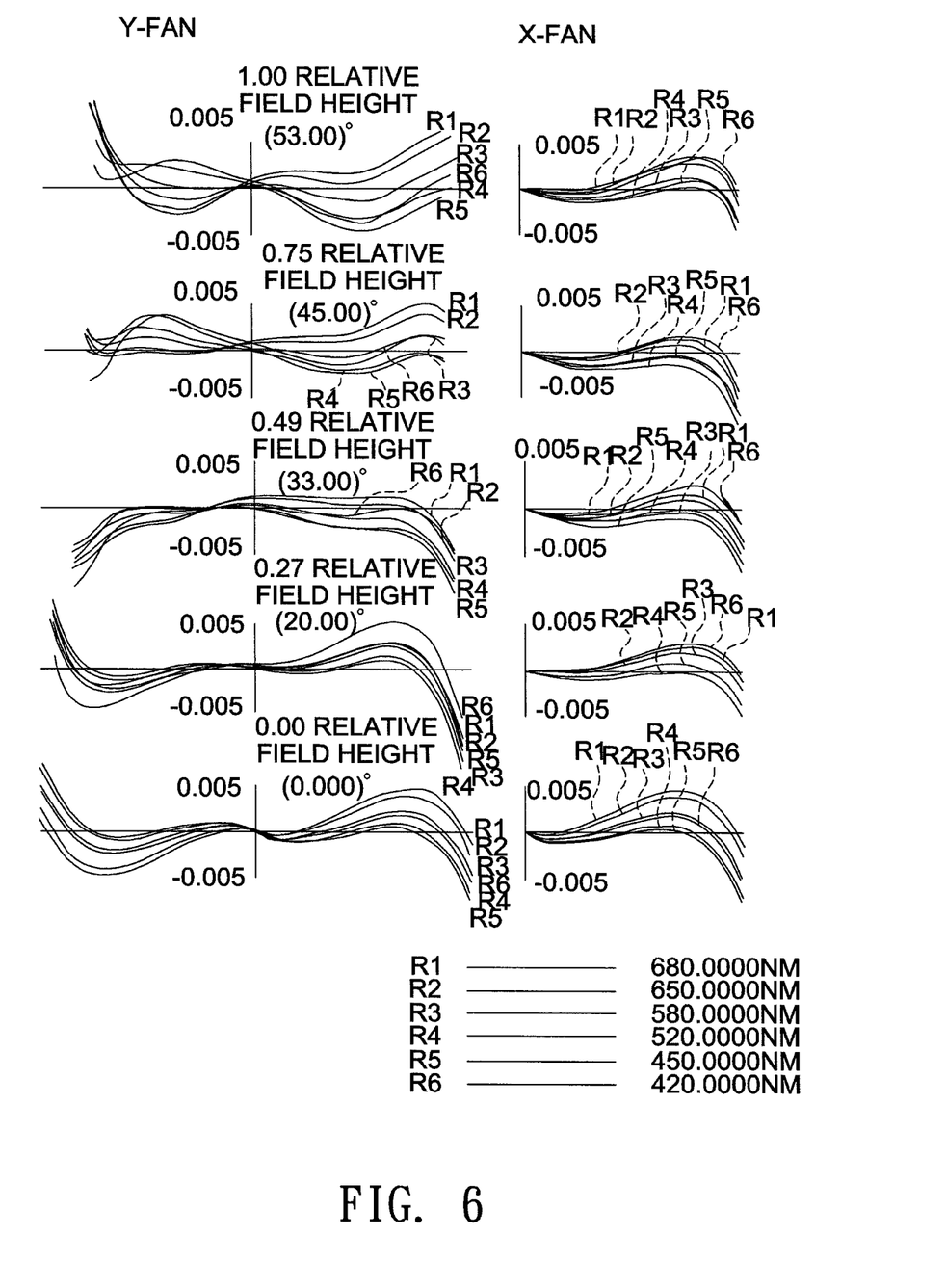
FIG. 6 shows a visible-light ray fan plot of the optical lens shown in FIG. 5.

FIG. 6 shows a visible-light ray fan plot of the optical lens 10c, where an abscissa of the plot represents entrance pupil positions, and an ordinate of the plot represents relative numerical values of positions on an image plane (such as the image plane 18) where main light beams are projected. The simulated results shown in FIG. 6 is within permitted ranges specified by the standard, which indicates the optical lens 10c according to the above embodiment may achieve good imaging quality.

Figure 7:
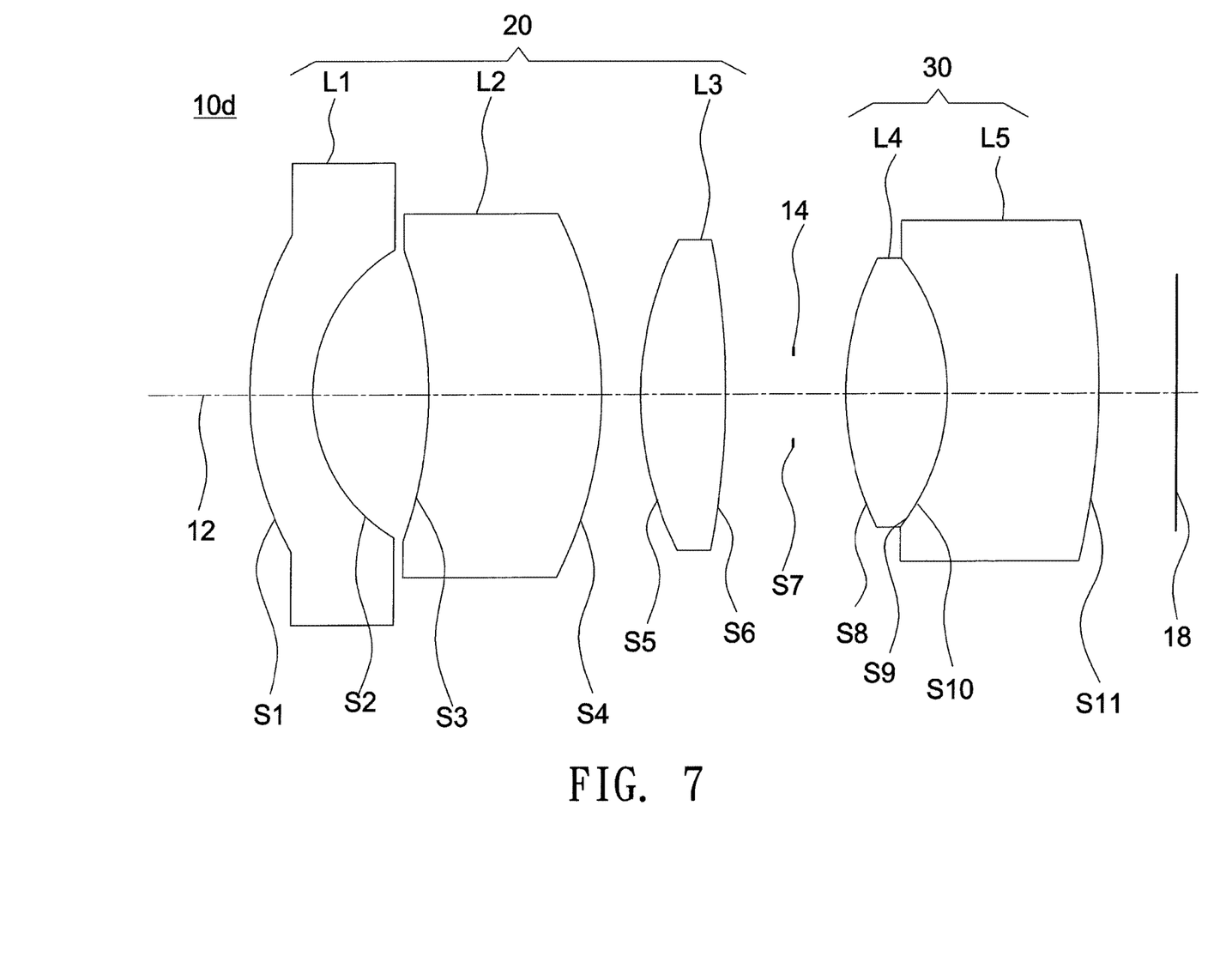
FIG. 7 shows a schematic diagram illustrating an optical lens according to another embodiment of the invention.

FIG. 7 shows a schematic diagram illustrating an optical lens according to another embodiment of the invention. The optical lens 10d is disposed between a magnified side (such as an object side on the left of FIG. 7) and a minified side (such as an image side on the right of FIG. 7). As shown in FIG. 7, the optical lens 10d may include a first lens group 20 (such as a front lens group) with positive refractive power disposed between the magnified side and the minified side, a second lens group 30 (such as a rear lens group) with positive refractive power disposed between the first lens group 20 and the minified side, and an aperture stop 14 disposed between the first lens group 20 and the second lens group 30. Further, a visible light image plane of the optical lens 10d is designated by a numeral 18. The first lens group 20 may include a first lens L1, a second lens L2 and a third lens L3 arranged in order, along the optical axis 12, from the magnified side to the minified side. The second lens group 30 may include a fourth lens L4 and a fifth lens L5 arranged in order, along the optical axis 12, from the magnified side to the minified side. The refractive powers of the first lens L1 to the fifth lens L5 are negative, positive, positive, positive, negative. In this embodiment, the first lens L1 and the fifth lens L5 are aspheric lenses fabricated by glass molding. The second lens L2 is a meniscus lens, and the third lens L3 and the fourth lens L4 are biconvex lenses. In this embodiment, a refractive index variation as a function of temperature (dn/dt) of the third lens L3 may be smaller than $-6 \times 10^{-6} \circ C.^{-1}$, but the invention is not limited thereto. In that case, a thermal focus shift of the third lens is comparatively large to reduce the overall thermal focus shift and enhance the optical performance of the optical lens. In one embodiment, the first lens L1 to the fifth lens L5 are separate from each other. The detailed optical data of the optical lens 10d such as lens parameters, shape and aspheric coefficients are shown in Tables 7-8 below. Parameters A-N shown in Table 8 are 1th to 14th order aspheric coefficients of Equation 2. In this embodiment, because the optical lens is a fixed focus lens, a distance between any two lenses in the optical lens remains fixed on picking-up images at various object distances.

TABLE 7

| Surface | Radius (mm) | Thickness (mm) | Refractive index | Abbe number | Object description |
|---|---|---|---|---|---|
| S1* | −8.835 | 1.599 | 1.814 | 40.290 | L1(aspheric) |
| S2* | 6.615 | 2.637 | | | |
| S3 | −8.843 | 4.002 | 1.892 | 40.764 | L2(meniscus) |
| S4 | −7.953 | 1.087 | | | |
| S5 | 6.192 | 1.855 | 1.500 | 81.545 | L3(biconvex) |
| S6 | −16.194 | 1.557 | | | |
| S7 | ∞ | 1.500 | | | aperture stop |
| S8 | 6.160 | 2.196 | 1.607 | 23.950 | L4(biconvex) |
| S9 | −4.135 | 0.050 | | | |
| S10* | −4.262 | 3.601 | 1.848 | 23.950 | L5(aspheric) |
| S11* | 189.896 | 1.752 | | | |
| | | | | | image plane |

Effective focal length (EFL) for visible light of the optical lens = 5.05 mm
Effective focal length (EFL) for visible light of the third lens L3 = 9.22 mm
F-Number = 1.8
Maximum half field of view (HFOV) = 53 degrees
Maximum image circle (IMA) of the visible light image plane = 3.16 mm
Total track length TTL (distance between the surface S1 and the visible light image plane) = 21.84 mm A thickness of the surface S1 is a distance between the surface S1 and the surface S2 along the optical axis 12, a thickness of the surface S2 is a distance between the surface S2 and the surface S3 along the optical axis 12, and a thickness of the surface S11 is a distance between the surface S11 and the visible light image plane 18 along the optical axis 12.

TABLE 8

| | S1 | S2 | S10 | S11 |
|---|---|---|---|---|
| k | 0 | 0 | 0 | 0 |
| A | 0 | 0 | 0 | 0 |
| B | 1.985E−01 | 1.842E−01 | 0 | 0 |
| C | −8.160E−03 | −1.631E−02 | 0 | 0 |
| D | 4.406E−03 | 9.997E−03 | −2.932E−03 | 0 |
| E | −1.707E−03 | 2.789E−03 | 0 | 0 |
| F | 2.074E−04 | −5.871E−03 | 2.804E−04 | 3.674E−04 |
| G | −3.435E−04 | 3.932E−04 | 0 | 0 |
| H | 1.389E−04 | 1.009E−03 | −2.247E−05 | −3.238E−05 |
| I | −1.993E−05 | −3.423E−04 | 0 | 0 |

TABLE 8-continued

| | S1 | S2 | S10 | S11 |
|---|---|---|---|---|
| J | 9.736E−07 | 3.403E−05 | 1.450E−06 | 3.104E−06 |
| K | 0 | 0 | 0 | 0 |
| L | 0 | 0 | 0 | −1.865E−07 |
| M | 0 | 0 | 0 | 0 |
| N | 0 | 0 | 0 | 4.632E−09 |

Figure 8:
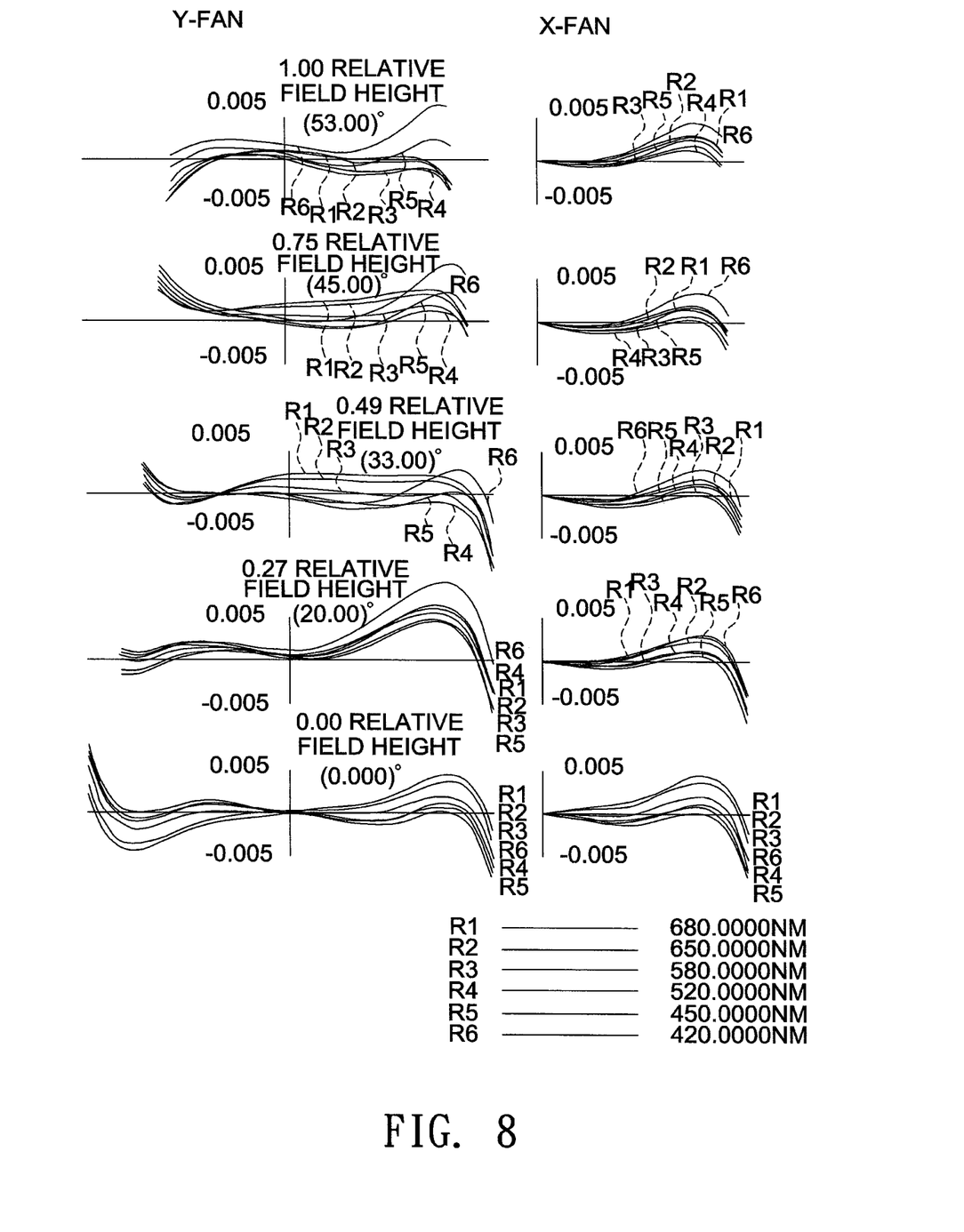
FIG. 8 shows a visible-light ray fan plot of the optical lens shown in FIG. 7.

FIG. 8 shows a visible-light ray fan plot of the optical lens 10d, where an abscissa of the plot represents entrance pupil positions, and an ordinate of the plot represents relative numerical values of positions on an image plane (such as the image plane 18) where main light beams are projected. The simulated results shown in FIG. 8 is within permitted ranges specified by the standard, which indicates the optical lens 10d according to the above embodiment may achieve good imaging quality.

Figure 9:
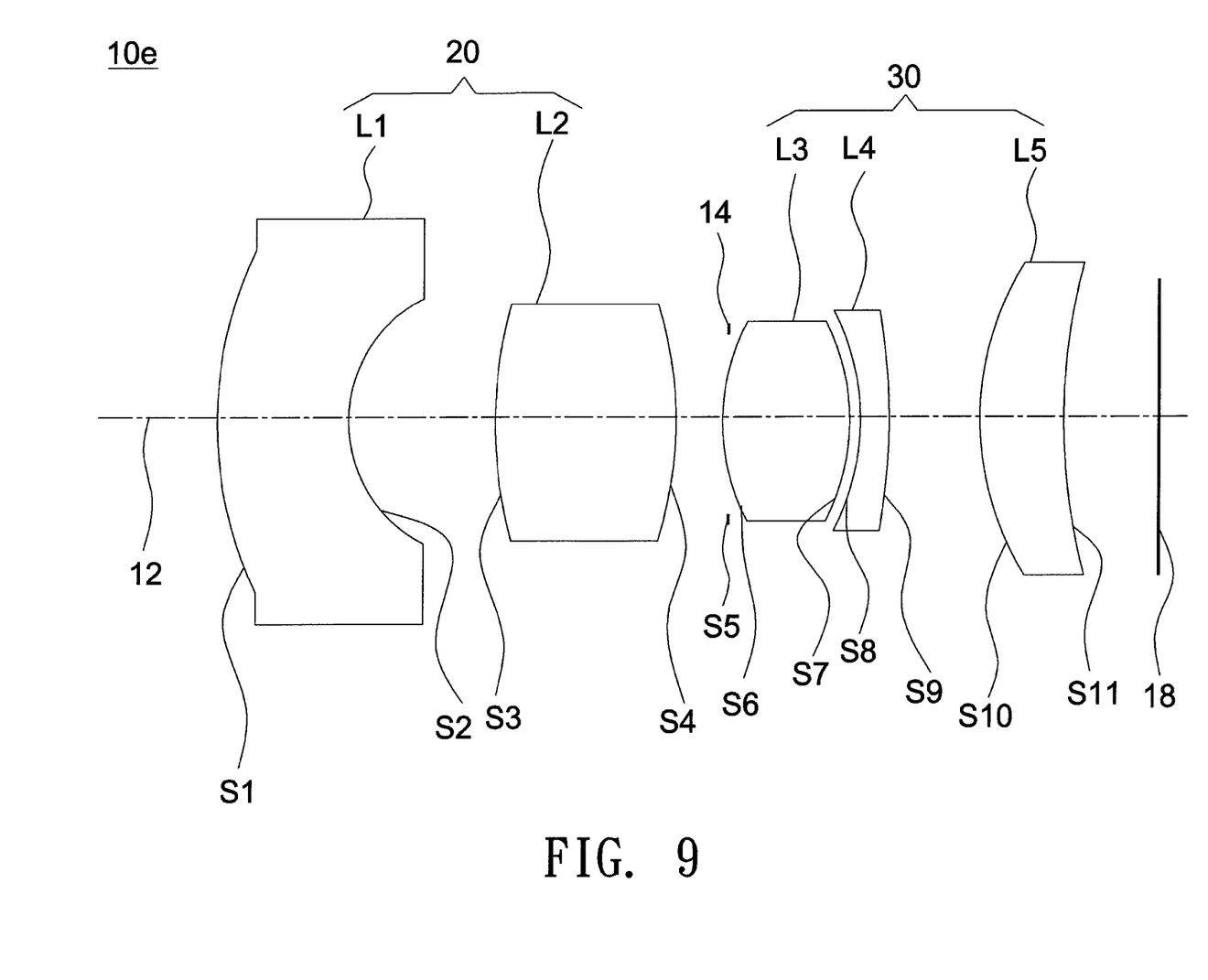
FIG. 9 shows a schematic diagram illustrating an optical lens according to another embodiment of the invention.

FIG. 9 shows a schematic diagram illustrating an optical lens according to another embodiment of the invention. The optical lens 10e is disposed between a magnified side (such as an object side on the left of FIG. 9) and a minified side (such as an image side on the right of FIG. 9). As shown in FIG. 9, the optical lens 10e may include a first lens group 20 (such as a front lens group) with positive refractive power disposed between the magnified side and the minified side, a second lens group 30 (such as a rear lens group) with positive refractive power disposed between the first lens group 20 and the minified side, and an aperture stop 14 disposed between the first lens group 20 and the second lens group 30. Further, a visible light image plane of the optical lens 10e is designated by a numeral 18. The first lens group 20 may include a first lens L1 and a second lens L2 arranged in order, along the optical axis 12, from the magnified side to the minified side. The second lens group 30 may include a third lens L3, a fourth lens L4 and a fifth lens L5 arranged in order, along the optical axis 12, from the magnified side to the minified side. The refractive powers of the first lens L1 to the fifth lens L5 are negative, positive, positive, negative, positive. In this embodiment, the first lens L1 is an aspheric lens fabricated by glass molding. The second lens L2 and the third lens L3 are biconvex lenses, and the fourth lens L4 and the fifth lens L5 are meniscus lenses. In this embodiment, a refractive index variation as a function of temperature (dn/dt) of the third lens L3 may be smaller than −6×10⁻⁶ °C.⁻¹, but the invention is not limited thereto. In that case, a thermal focus shift of the third lens is comparatively large to reduce the overall thermal focus shift and enhance the optical performance of the optical lens. In one embodiment, the first lens L1 to the fifth lens L5 are separate from each other. The detailed optical data of the optical lens 10e such as lens parameters, shape and aspheric coefficients are shown in Tables 9-10 below. Parameters A-F shown in Table 10 are 4th, 6th, 8th, 10th, 12th and 14th order aspheric coefficients of Equation 1. In this embodiment, because the optical lens is a fixed focus lens, a distance between any two lenses in the optical lens remains fixed on picking-up images at various object distances.

TABLE 9

| Surface | Radius (mm) | Thickness (mm) | Refractive index | Abbe number | Object description |
|---|---|---|---|---|---|
| S1* | 4.989 | 3.010 | 1.814 | 40.000 | L1(aspheric) |
| S2* | 1.828 | 3.212 | | | |
| S3 | 10.922 | 4.052 | 1.835 | 42.714 | L2(biconvex) |
| S4 | −8.210 | 1.049 | | | |
| S5 | ∞ | 0.100 | | | aperture stop |
| S6 | 6.812 | 2.750 | 1.500 | 81.608 | L3(biconvex) |
| S7 | −4.934 | 0.116 | | | |
| S8 | −4.794 | 0.600 | 1.946 | 17.984 | L4(meniscus) |
| S9 | −15.086 | 2.291 | | | |
| S10 | 6.907 | 1.762 | 1.883 | 40.765 | L5(meniscus) |
| S11 | 17.579 | 2.057 | | | |
| | | | | | image plane |

Effective focal length (EFL) for visible light of the optical lens = 5.05 mm
Effective focal length (EFL) for visible light of the third lens L3 = 6.213 mm
F-Number = 1.8
Maximum half field of view (HFOV) = 53 degrees
Maximum image circle (IMA) of the visible light image plane = 3.16 mm
Total track length TTL (distance between the surface S1 and the visible light image plane) = 21.0 mm A thickness of the surface S1 is a distance between the surface S1 and the surface S2 along the optical axis 12, a thickness of the surface S2 is a distance between the surface S2 and the surface S3 along the optical axis 12, and a thickness of the surface S11 is a distance between the surface S11 and the visible light image plane 18 along the optical axis 12.

TABLE 10

| | S1 | S2 |
|---|---|---|
| k | 0 | −1.23 |
| A | −2.734E−03 | 6.520E−04 |
| B | −1.051E−04 | −7.479E−04 |
| C | −6.441E−06 | −9.899E−05 |
| D | 6.945E−07 | 5.398E−05 |
| E | −1.922E−08 | −6.672E−06 |
| F | 4.940E−11 | 2.843E−07 |

Figure 10:
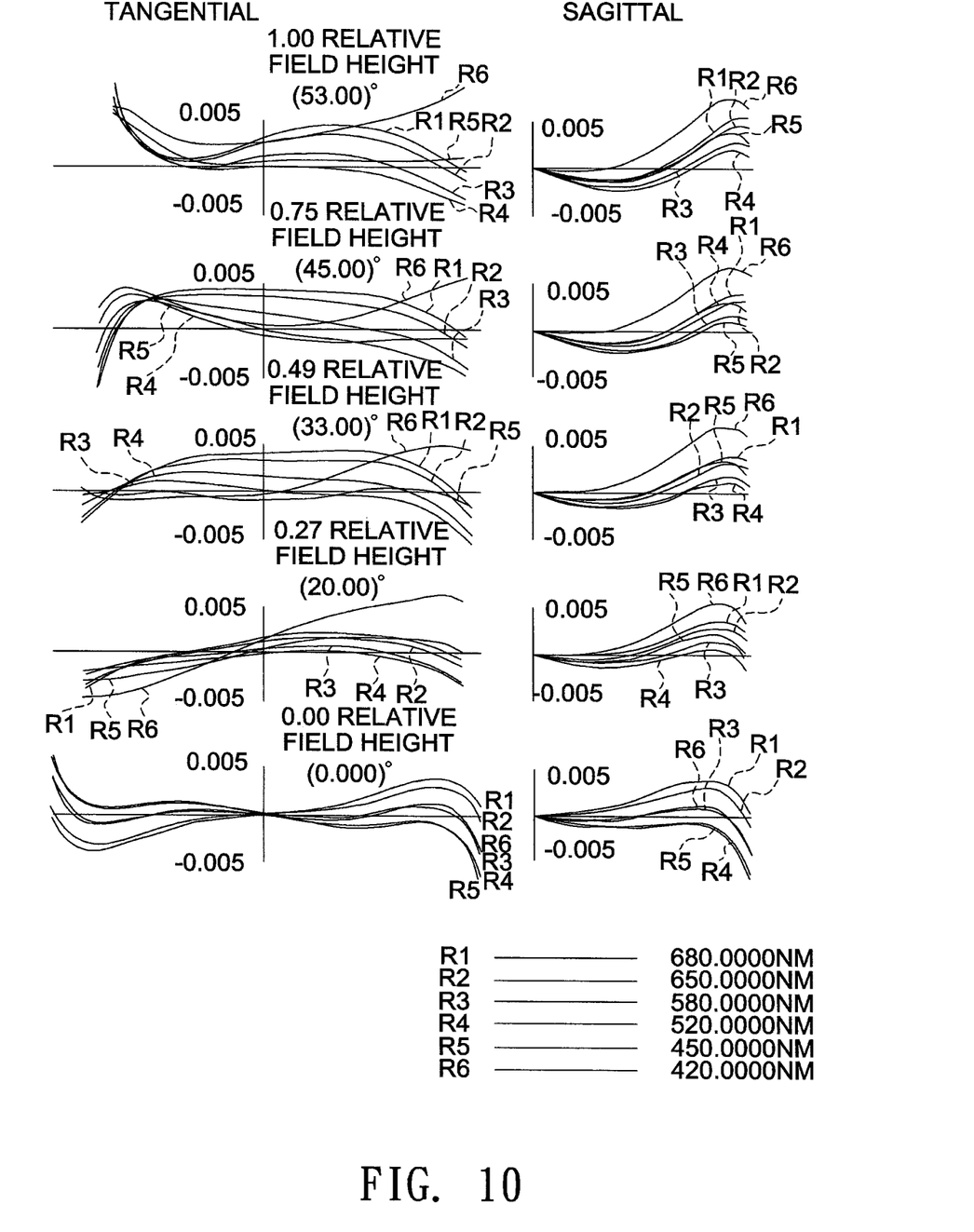
FIG. 10 shows a visible-light ray fan plot of the optical lens shown in FIG. 9.

FIG. 10 shows a visible-light ray fan plot of the optical lens 10e, where an abscissa of the plot represents entrance pupil positions, and an ordinate of the plot represents relative numerical values of positions on an image plane (such as the image plane 18) where main light beams are projected. The simulated results shown in FIG. 10 is within permitted ranges specified by the standard, which indicates the optical lens 10e according to the above embodiment may achieve good imaging quality.

According to an embodiment of the invention, an optical lens may include two lens groups, and a total number of lenses with refractive power of the two lens groups is larger than three. The two lens groups may include an aspheric lens with negative refractive power, and the optical lens may have an aperture stop disposed between the two lens groups, where the aspheric lens with negative refractive power is located on one side of the aperture stop and is further away from the aperture stop than any other lens on the same side of the aperture stop. The optical lens may satisfy the following condition:

$$0.05 > [y(\theta) - (EFL * \sin \theta)]/(EFL * \sin \theta) > -0.3$$

where θ denotes a half field of view, y(θ) denotes an image height of an image plane for visible light with respect to the half field of view θ, and EFL denotes an effective focal length for visible light of the optical lens. When the above condition is met, a center image of the optical lens may have a proper size to enhance the overall optical performance. In case the optical lens is designed to meet the condition [y(θ)−(EFL*sin θ)]/(EFL*sin θ)>0.05, the center image of the optical lens may be compressed to result in severe image distortion. In contrast, in case the optical lens is designed to meet the condition [y(θ)−(EFL*sin θ)]/(EFL*sin θ)<−0.3, the center image of the optical lens may expand to similarly result in severe image distortion.

According to an embodiment of the invention, an optical lens may include two lens groups arranged along an optical axis and an aperture stop disposed between the two lens groups. An aspheric lens with negative refractive power is located on one side of the aperture stop and is further away from the aperture stop than any other lens on the same side of the aperture stop. The optical lens may have two lenses with positive refractive power located closer to the aspheric lens than any other lens of the optical lens. As shown in FIG. 1, a surface S1 of an aspheric lens L1 facing away from the aperture stop has a clear aperture CA. A point A of the surface S1 is located in a position corresponding to 50% of the clear aperture CA, a point B of the surface is located in a position corresponding to 95% of the clear aperture CA, a point C of the surface S1 is an intersection of the optical axis 12 and the surface S1, and a point D of the surface S1 is located in an outermost position corresponding to 100% of the clear aperture CA. In one embodiment, a slope of the surface at the point A has an absolute value of larger than 0.25, and a slope of the surface at the point B has an absolute value of smaller than 0.1.

According to an embodiment of the invention, an optical lens may satisfy the following condition:

$$EFL/f3 > 0.5$$

where f3 denotes an effective focal length for visible light of the third lens L3, and EFL denotes an effective focal length for visible light of the optical lens.

According to the above embodiments, the optical lens may achieve at least one advantage of good imaging quality, higher degree of miniaturization, lighter weights and lower fabrication costs. Further, in one embodiment, a working temperature range of −40° C. to 105° C. and a five-pieces lens design can be provided to achieve at least one advantage of lower fabrication costs, larger apertures, higher resolution, wider viewing angles, lighter weights, wider working temperature ranges and good imaging quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An optical lens, comprising:
   two lens groups, a total number of lenses with refractive power of the two lens groups being larger than three, a total number of aspheric lenses of the two lens groups is no more than two, and at least one aspheric lens of the optical lens having negative refractive power; and
   an aperture stop disposed between the two lens groups, the aspheric lens with negative refractive power being located on one side of the aperture stop and further away from the aperture stop than any other lens on the same side of the aperture stop, and the optical lens satisfying the following condition:

$$0.05 > [y(\theta) - (EFL*\sin\theta)]/(EFL*\sin\theta) > -0.3$$

where θ denotes a half field of view, y(θ) denotes an image height of an image plane for visible light with respect to the half field of view θ, and EFL denotes an effective focal length for visible light of the optical lens.

2. The optical lens as claimed in claim 1, wherein the two lens groups comprises two lenses with positive refractive power located closer to the aspheric lens with negative refractive power than any other lens of the optical lens.

3. The optical lens as claimed in claim 2, wherein one of the two lenses with positive refractive power that is disposed further away from the aspheric lens with negative refractive power has a refractive index variation as a function of temperature (dn/dt) of smaller than $-6 \times 10^{-6}$° $C.^{-1}$.

4. The optical lens as claimed in claim 2, wherein one of the two lenses with positive refractive power that is disposed further away from the aspheric lens with negative refractive power satisfies the condition:

$$EFL/f3 > 0.5$$

where f3 denotes an effective focal length for visible light of the one of the two lenses, and EFL denotes an effective focal length for visible light of the optical lens.

5. The optical lens as claimed in claim 2, wherein one of the two lenses with positive refractive power that is located closer to the aspheric lens with negative refractive power is a spherical lens.

6. The optical lens as claimed in claim 1, wherein a total track length of the optical lens is equal to or greater than 19.66 mm.

7. The optical lens as claimed in claim 1, wherein a distance between any two lenses in the optical lens remains fixed on picking-up images at various object distances.

8. The optical lens as claimed in claim 1, wherein the lenses of the two lens groups are separate from each other.

9. The optical lens as claimed in claim 1, wherein a ratio of a maximum image circle diameter to a total track length of the optical lens is no more than 0.1607.

10. The optical lens as claimed in claim 1, wherein the aspheric lens with negative refractive power has a surface facing away from the aperture stop and a clear aperture, a first point of the surface is located in a position corresponding to 50% of the clear aperture, a second point of the surface is located in a position corresponding to 95% of the clear aperture, a slope of the surface at the first point having an absolute value of larger than 0.25, and a slope of the surface at the second point having an absolute value of smaller than 0.1.

11. The optical lens as claimed in claim 10, wherein one of the two lenses with positive refractive power that is disposed further away from the aspheric lens with negative refractive power has a refractive index variation as a function of temperature (dn/dt) of smaller than $-6\times10^{-6}$ $°C.^{-1}$.

12. The optical lens as claimed in claim 10, wherein one of the two lenses with positive refractive power that is disposed further away from the aspheric lens with negative refractive power satisfies the condition:

EFL/f3>0.5 where f3 denotes an effective focal length for visible light of the one of the two lenses, and EFL denotes an effective focal length for visible light of the optical lens.

13. The optical lens as claimed in claim 10, wherein one of the two lenses with positive refractive power that is located closer to the aspheric lens with negative refractive power is a spherical lens.

14. The optical lens as claimed in claim 10, wherein a total track length of the optical lens is equal to or greater than 19.66 mm.

15. The optical lens as claimed in claim 10, wherein a distance between any two lenses in the optical lens remains fixed on picking-up images at various object distances.

16. The optical lens as claimed in claim 10, wherein the lenses of the two lens groups are separate from each other.

17. The optical lens as claimed in claim 10, wherein the aspheric lens with negative refractive power is fabricated by glass molding.

18. The optical lens as claimed in claim 1, wherein the two lens groups comprising a first lens, a second lens, a third lens, a fourth lens and a fifth lens arranged in order from a magnified side to a minified side, the first lens being aspherical, and the third lens having a refractive index variation as a function of temperature (dn/dt) of smaller than $-6\times10^{-6}$ $°C.^{-1}$.

19. The optical lens as claimed in claim 18, wherein the first lens to the fifth lens have respective refractive powers of (i) negative, positive, positive, negative and positive, or (ii) negative, positive, positive, positive and negative.

20. The optical lens as claimed in claim 18, wherein the second lens is an aspheric lens, a meniscus lens or a biconvex lens, the third lens is a biconvex lens, and the fifth lens is an aspheric lens or a meniscus lens.

* * * * *